United States Patent
Kapuria et al.

(10) Patent No.: US 10,745,030 B2
(45) Date of Patent: Aug. 18, 2020

(54) PROVIDING LOCATION AND DRIVING BEHAVIOR BASED ALERTS

(71) Applicant: THE HI-TECH ROBOTIC SYSTEMZ LTD, Gurugram, Haryana (IN)

(72) Inventors: Anuj Kapuria, Haryana (IN); Ritukar Vijay, Haryana (IN)

(73) Assignee: THE HI-TECH ROBOTIC SYSTEMZ LTD, Gurugram (IN)

( * ) Notice: Subject to any disclaimer, the term of this patent is extended or adjusted under 35 U.S.C. 154(b) by 0 days.

(21) Appl. No.: 16/233,163

(22) Filed: Dec. 27, 2018

(65) Prior Publication Data
US 2019/0202477 A1    Jul. 4, 2019

(30) Foreign Application Priority Data
Dec. 30, 2017    (IN) .............................. 201711047391

(51) Int. Cl.
| | |
|---|---|
| *B60W 50/14* | (2020.01) |
| *B60W 40/09* | (2012.01) |
| *G06K 9/00* | (2006.01) |
| *B60W 40/08* | (2012.01) |

(52) U.S. Cl.
CPC ............ *B60W 50/14* (2013.01); *B60W 40/09* (2013.01); *G06K 9/00221* (2013.01); *G06K 9/00832* (2013.01); *G06K 9/00838* (2013.01); *G06K 9/00845* (2013.01); *G06K 9/00892* (2013.01); *B60W 2040/0809* (2013.01); *B60W 2050/143* (2013.01)

(58) Field of Classification Search
CPC ................. B60W 50/14; B60W 40/09; B60W 2050/143; B60W 2040/0809; G06K 9/00892; G06K 9/00221; G06K 9/00832; G06K 9/00845; G06K 9/00838
See application file for complete search history.

(56) References Cited

U.S. PATENT DOCUMENTS

2017/0369073 A1*  12/2017  Huber ............... B60W 50/0098

FOREIGN PATENT DOCUMENTS

WO    WO-2015166721 A1 * 11/2015  ........... B60R 16/037

* cited by examiner

*Primary Examiner* — Ryan W Sherwin (57) ABSTRACT

The present subject matter relates to providing alerts to the driver based on comparison between the driver's driving behaviour and the general driving behavior. Driver presence is determined after which the driver is identified using identification attributes extracted. Further, data related to external environment to a vehicle is fetched. Based on the fetched external environment data an event is determined. Also, the driving behavior of the driver is compared with the general driving behavior for the vehicle. Based on the determined event and the deviations of driver's driving behavior from the general driving behavior, suggestive alert is generated for the driver of the vehicle. The intensity of the warning is varied based on severity of the event.

15 Claims, 7 Drawing Sheets

PROVIDING LOCATION AND DRIVING BEHAVIOR BASED ALERTS

CROSS REFERENCE TO RELATED APPLICATIONS

The present application claims the benefit of Indian Patent application No. 201711047391 filed on Dec. 30, 2017, the contents of which are hereby incorporated by reference.

TECHNICAL FIELD

The present subject matter relates generally to monitoring drivers and particularly to monitoring driving pattern of a driver in a vehicle, and providing driving behavior change alerts to the driver for more efficient driving in various situations.

BACKGROUND

Modern vehicles are generally equipped with various types of monitoring systems, such as cameras, or video recorders to monitor surrounding environment of vehicles and provide a driver of a vehicle with useful data regarding the surrounding environment for improved driving. Such monitoring systems may be installed, for instance, on a roof of the vehicle or on the front portion, back portion of the vehicle to have a broad view of the surrounding environment and capture data associated with objects, pedestrians or vehicles within the surrounding environment.

In addition, the monitoring systems may also monitor the driver of the vehicle for facial pose and gaze. For instance, the driver may be monitored for orientation of the face and the gaze to be in a forward direction and determine if the driver is paying attention on the road. The collected data is then subjected to processing to derive meaningful information that may be used in assisting the driver for navigation, changing lanes, and averting a potential collision. An event, such as an approaching vehicle, a pedestrian on the road may be detected and a warning may be issued to the driver to help the driver initiate a precautionary action.

However, such monitoring systems, on many occasions, fail to detect events with accuracy due to various factors such as incomplete data or incorrect data, and issue false or irrelevant warnings to the driver. These warnings are generally issued at high volumes to alert the driver that on many instances may startle or distract the driver, thereby inciting a sudden action that could be potentially harmful for the safety of the driver. Further, such irrelevant warnings issued regularly at high volumes may cause a general discomfort, and impact driving of the driver. Therefore, the monitoring systems are not efficient in detecting events and issuing relevant warning to the drivers for enhancing driving experience and safety.

SUMMARY

This summary is provided to introduce concepts related to monitoring drivers and providing relevant alerts to driving behavior of the drivers. This summary is not intended to identify essential features of the claimed subject matter nor is it intended for use in determining or limiting the scope of the claimed subject matter.

In an example implementation of the present subject matter, a method for assisting a driver of a vehicle is provided. The method includes steps of determining presence of a driver in the vehicle. The presence of the driver is determined by identifying at least one attribute of the driver. The attribute of the driver is indicative of a driving profile of the driver. Further, the attribute identified is compared with a plurality of stored driving profiles corresponding to plurality of drivers. The comparison is carried out to determine a new driver for the vehicle.

Thereafter, driving profile of the new driver is fetched. The driving profile of the new driver and the plurality of drivers may be stored in a central server. All the data of the plurality of drivers like identification, driving behavior, etc. is stored within the central server. Furthermore, the method includes detection of event. The event may be associated with a possible collision. Further, simultaneously, the driving behavior of the new driver fetched is compared with an optimum driving behavior. The optimum driving behavior indicates past driving history of the vehicle by one or more drivers under the similar driving conditions and driving of other drivers at a location. Thereafter a suggestive alert is generated, for the new driver, to handle the vehicle for the event.

Although, the present subject matter has been described with reference to an integrated system comprising the modules, the present subject matter may also be applicable to provide alerts to a driver of the vehicle by the modules placed at different areas within an autonomous vehicle, wherein the modules are communicatively coupled to each other.

Thus, the present subject matter provides efficient techniques for detecting events and alerting a driver. The techniques provide adaptive warning to the driver of the vehicle, wherein intensity level of the warning is varied based on the external environment data. Further, the events detected are accurate and the warning generated are relevant to a specific situation to enable the driver respond aptly to the events thereby enhancing driver safety.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DETAILED DESCRIPTION

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

Figure 1:
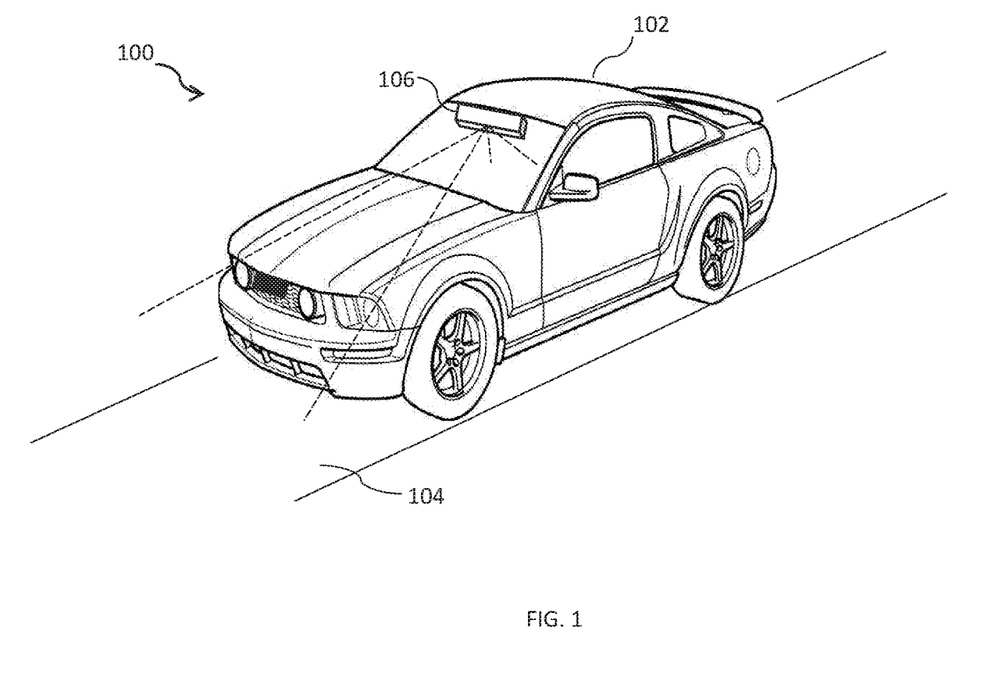
FIG. 1 illustrates an example environment having a vehicle configured with a warning system in accordance with an aspect of the present subject matter.

Referring now to FIG. 1, an example environment 100 in which various embodiments may function is illustrated. As shown the environment 100 includes a vehicle 102 moving or being driven on a road 104. The vehicle 102 may be a car, a jeep, a truck, a bus, or a three-wheeler vehicle. The vehicle 102 may have parts like steering wheel, tires, brake, engine, carburetor, doors, horn, lights, etc. not shown in the figure. Also, the vehicle 102 may be provided with physical actuators connected to critical function parts like brakes, engine control unit, steering wheel, horn and lights.

The vehicle 102 further includes an advanced driver assistance system (ADAS) 106 positioned such that the ADAS 106 may monitor the driver and may monitor the external environment. In one example, the warning ADAS 106 may be positioned close to the rear view minor of the vehicle 102. It would be noted that, although the ADAS 106 is shown positioned near the rear view minor, the ADAS 106 may be positioned at other places with in the vehicle 102. For instance, the ADAS 106 may be positioned on one of a windshield behind an internal rear view mirror, an "A" pillar of the vehicle 102, and on a dashboard.

The ADAS 106 may have various modules to collect external data, such as data associated with roads, pedestrians, objects, road edges, lane marking, potential collision, speed signs, potholes, vehicles, location of the vehicle, and a driving pattern of the driver on the road. Additionally, the ADAS 106 may monitor driving pattern of the driver such as whether the driving is in line with the lanes and boundaries of a road. Further, the modules may also capture data related to driver state, such as facial features, retinal scan, blink rate of eyes, eyeball movement, opening of the eye, and head movement of the driver. The ADAS 106 may also warn the driver corresponding to events, such as a pedestrian crossing the road, or a cyclist in front of the vehicle.

It would be noted that ADAS 106, in one example, may have the modules placed at different positions within the vehicle. For instance, the module for monitoring the driver may be coupled to the windscreen and the module to generate the warning may be coupled to the A-pillar. Such components may either be connected through a wired connection or through a wireless communication to communicate and share data.

In one example, the ADAS 106 may be connected to an external server (not shown in figure) through a wireless network, such as a datacenter for cloud backup and data archiving purpose. For instance, information associated with occurrence of an event and preventive action taken by the driver may be recorded for a predefined time span of 1 minute, 30 seconds, or 5 seconds and relayed to the datacenter. Such information may be stored within the datacenter and may be used for analyzing driver pattern during the events and providing useful information to other drivers in similar situations. Also, the information may be utilized for validating insurance claims or insurance premium calculations.

In another example, the ADAS 106 may be connected to the actuators as mentioned above. This helps to take over control of these critical function parts in an event of user failing to react.

The details of the components or modules of the ADAS 106 and functionality of the modules have been further explained with reference to description of the forthcoming figures.

Figure 2:
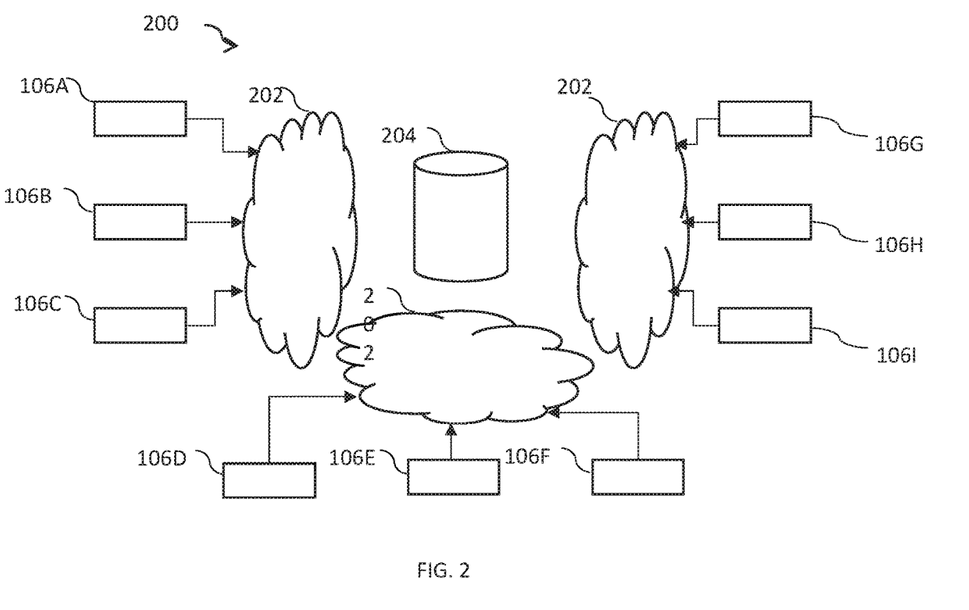
FIG. 2 illustrates a plurality of driver assistance systems connected to each other, in accordance with an aspect of the present subject matter.

FIG. 2 illustrates an environment 200 wherein multiple ADAS' 106A-106N connected to a central server 204, in accordance with an implementation of the present subject matter. The multiple ADAS' 106A-106N may share and store various information with the central server 204. The communication of information may be through a network 202 that may be any one of a satellite communication, or mobile communication protocols. Each of the connected ADAS' 106A-106N may also access information of other systems when required.

Figure 3:
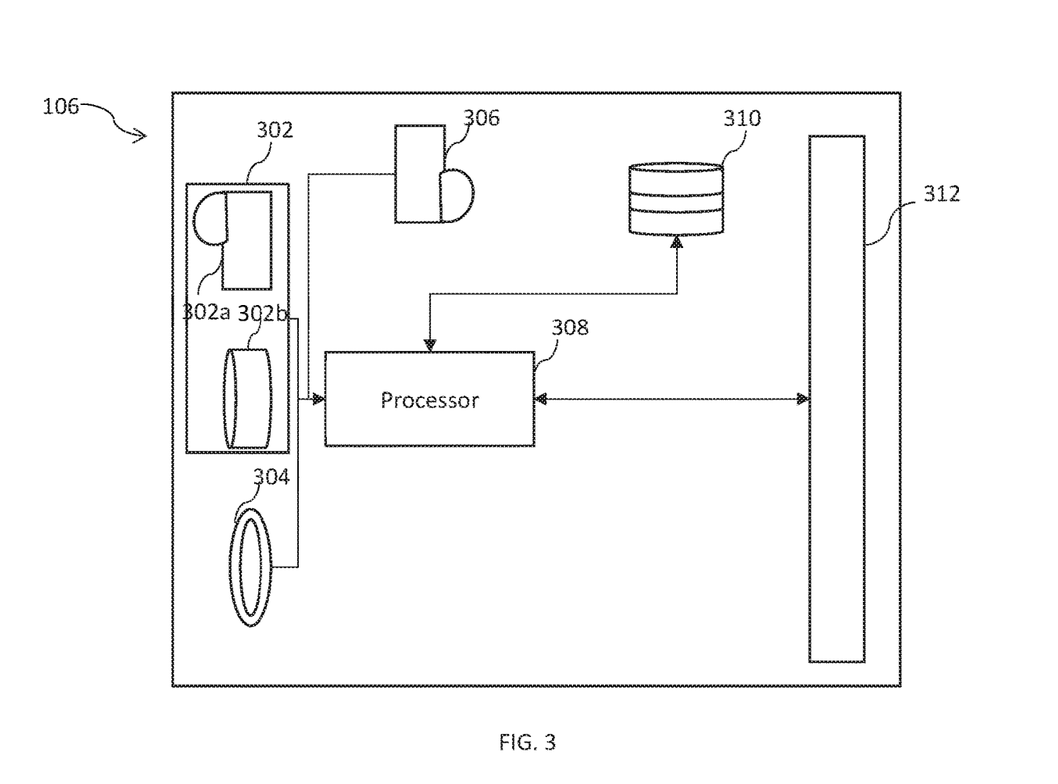
FIG. 3 illustrates various modules of a warning system, in accordance with an aspect of the present subject matter.

FIG. 3 illustrates various modules of the ADAS 106, in accordance with an implementation of the present subject matter. The ADAS 106 includes an exterior monitoring module 302, a driver monitoring module 306, a ranging module 304, a processor 308, a memory 310, and a warning generation module 312. The processor 308 may be communicably connected to the exterior monitoring module 302, the driver monitoring module 306, and the ranging module 304. The processor 308 may also be communicably connected to the memory 310, and the warning generation module 312.

In an embodiment of the present subject matter, the exterior monitoring module 302 may include a stereo camera 302A and a long range narrow field camera 302B. The stereo camera 302A may be a dual lens camera having a short range. This helps the stereo camera 302A to capture data within a short distance of the vehicle 102. The stereo camera 302A captures the nearby objects, events and data. Further, the long range narrow field camera 302B is configured to capture events at a farther distance and hence captures objects, events and data at a longer distance from the vehicle 102. The stereo camera 302A and the long range narrow camera 302B may be configured to adjust autofocus with the changing environment. The capturing ranges of the stereo camera 302A and the long range narrow field camera 302B may overlap to capture maximum data from external environment. The exterior monitoring module 302 is configured to shift its region of interest. The shifting of the region of interest may be based upon a condition of path of travel of the vehicle 102. Details of shifting of region of interest will be described in detail in conjunction with FIGS. 4A-4C.

The driver monitoring module 306 is positioned to face the driver of the vehicle 102 and monitors presence of the driver. The driver monitoring module may also monitor driver state of the driver. The driver's presence may be determined using techniques like motion detection, occupancy sensing, thermal vision etc. The driver monitoring module 306, extracts attributes of the driver, once it is ascertained that the driver is present within the vehicle 102. Attributes extracted may include, but, not limited to facial scan, retinal scan, thermal signatures, fingerprint scan etc. In another example, the user's picture may be taken by the driver monitoring module 306. In yet another example, the driver's driving behavior may be used as an attribute. The attribute may be determined by the exterior monitoring module 302. The extracted attributes may be then compared with a database of drivers stored within a memory 310. On a successful match, the driver identity is then shared with the processor 308 for further processing. In another implementation, the extracted attributed may be then compared with a database of drivers stores within the central server 204. On a successful match, the driver identity is then shared with the processor 308 for further processing.

Also, the driver monitoring module 306 may also determine the driver state by utilizing driver's eye gaze, facial expressions and head movement. Various driver states that may be determined by the driver monitoring module 306 are fatigue, sleepiness, anger, happy, jolly, sad, neutral, etc. Hence the driver monitoring module 306 is capable of determining multiple driver states. In another implementation of the present subject matter, the driver monitoring module 306 may be a charged coupled device camera, or a Complementary Metal Oxide Semiconductor (CMOS) camera.

In yet another embodiment of the present subject matter, the ranging module 304, used for determining distance to objects may be one of a light detection and ranging (LiDAR) unit, a radio detection and ranging (RADAR), a sonic detection and ranging (SODAR), and a sound navigation and ranging (SONAR).

The processor 308, amongst other capabilities, may be configured to fetch and execute computer-readable instructions stored in a memory. The processor 308 may be implemented as one or more microprocessors, microcomputers, microcontrollers, digital signal processors, central processing units, state machines, logic circuitries, and/or any devices that manipulate signals based on operational instructions. The functions of the various elements shown in the figure, including any functional blocks labelled as "processor(s)", may be provided through the use of dedicated hardware as well as hardware capable of executing software in association with appropriate software.

The processor 308 and other modules like the exterior monitoring module 302, the driver monitoring module 306, and the ranging module 304 as described above may be implemented as hardware or software. If such modules are implemented in software, one or more processors of the associated computing system that performs the operation of the module direct the operation of the computing system in response to having executed computer-executable instructions. For example, such computer-executable instructions may be embodied on one or more computer-readable media that form a computer program product. In another implementation, the processor 308 may also be connected to GPS, indicator of the vehicle 102 or pre-fed path of the route to be covered by the vehicle 102.

In yet another embodiment of the present subject matter, the memory 310 may be utilized to store the collected external environment and internal environment data collected. The memory 310 may also be in communication with the central server 204 for exchange of information in a two-way manner. The memory 310 may be without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

In another embodiment of the present subject matter, the warning generation module 312 may include an audio, visual, or haptic warning interfaces. The warning generation module 312 may include a Light Emitting Diode (LED) display, a Liquid Crystal Display (LCD), a plasma display, a warning light emitter, a speaker, a haptic feedback module, or a combination thereof.

In operation, the exterior monitoring module 302 may continuously record the surrounding environment of the vehicle 102 and provide the input to the processor 208. In one example instant, the surrounding environment may include a pedestrian crossing the road and about 200 meters away from the vehicle 102, two vehicles ahead of the vehicle 102 at distances 210 meters and 220 meters and a cyclist on a left lane at a distance of 225 meters from the vehicle 102. The objects in the surrounding environment, such as the pedestrian, the two vehicles, and the cyclist are continuously monitored by the exterior monitoring module 302 in real-time and sent to the processor 308.

In another example, the exterior monitoring module 302 may also detect the lanes or boundaries of a road or path traveled by the vehicle 102.

The exterior monitoring module 302 may capture the driving pattern of the driver based on the area of the road 104 covered by the vehicle 102 during travel. This driving pattern may also be used as an attribute to identify the driver. The driving pattern attribute may be compared with stored driving pattern of plurality of drivers in the central server 204. For a completely new driver, the exterior monitoring module may capture his driving pattern and may store it within the memory 310 and also sent to the central server 204. For instance, the exterior monitoring module 302 may capture when the vehicle is driven along the lane or the boundary of the road 104, wherein the area covered by the vehicle 102 completely aligns with one of the lane and the boundary of the road 104. In a scenario, the vehicle may be driven in a particular manner by the new driver. This driving pattern may then be stored as driving pattern for that particular driver along with his other identification attributes.

It would also be noted that the driving pattern is indicative of the manner in which the vehicle 102 is being driven on the road 104. Hence, the driving pattern may also be utilized to forecast any possible event of a possible collision. For instance, when a driver is attentive then the driver is likely to drive in alignment with the lane or the boundary and when the driver is inattentive, drowsy, or under the influence of a drug, the driver may drive inconsistently and not in alignment with the lane or the boundary and may possibly face a collision condition.

Similarly, driver state data is captured by the driver monitoring module 306. For example, the driver monitoring module 306 may continuously monitor for presence of a driver. The monitoring module may use techniques, as have been described earlier, like sensing, presence sensing, thermal imaging etc. In another implementation, presence of the driver may also be ascertained when ignition of the vehicle 102 is initiated. Thereafter, the identification attributes of the driver may be extracted.

The attributes may be extracted in multiple ways and may be used to collect redundant information for ascertaining correct determination of the driver. The attribute may be extracted by the driver monitoring module 306. The driver monitoring module 304 extracts the retinal, facial, or voice scans. Other attribute may be extracted by prompting the user to place his fingers on the ADAS 106, to obtain finger scan. In another implementation, the driver monitoring module 306 may also be connected to a user device through which the driver may be identified based on unique ID of the user device. The user device may be a smartphone, smartwatch, etc. and unique ID may be IMEI ID of the smartphone or MAC address of the user device. The exterior monitoring module 302 may also capture driver's identification attribute by monitoring the driving pattern of the driver. All the attributes once extracted may be compared with the database of attributes corresponding to multiple drivers that may have driven the vehicle 102. If there is a successful match, then the driver is marked as recognized driver. In case there is no match, the driver is marked as a new driver.

In addition to the above, the driver monitoring module 306 may also record facial expressions of the driver for eye gaze, blink rate of eyelids, change in skin tone, nostrils, jaw movements, frowning, baring teeth, movement of cheeks, movement of lips and head movements when the driver is driving the vehicle on the road 104. The continuous recording of the driver state is fed to the processor 308.

In an example, the processor 308 receives the data from the exterior monitoring module 302 and the driver monitoring module 304 and processes the received data. The processor 308, may also send the information received, to the central server 204, to be stored for future. The processor 308, processes the data and identifies any event being faced by the driver and the vehicle 102, and the provides relevant suggestive alerts to the new driver. Details of the processing will be discussed in detail in the description in conjunction with FIG. 4.

Figure 4:
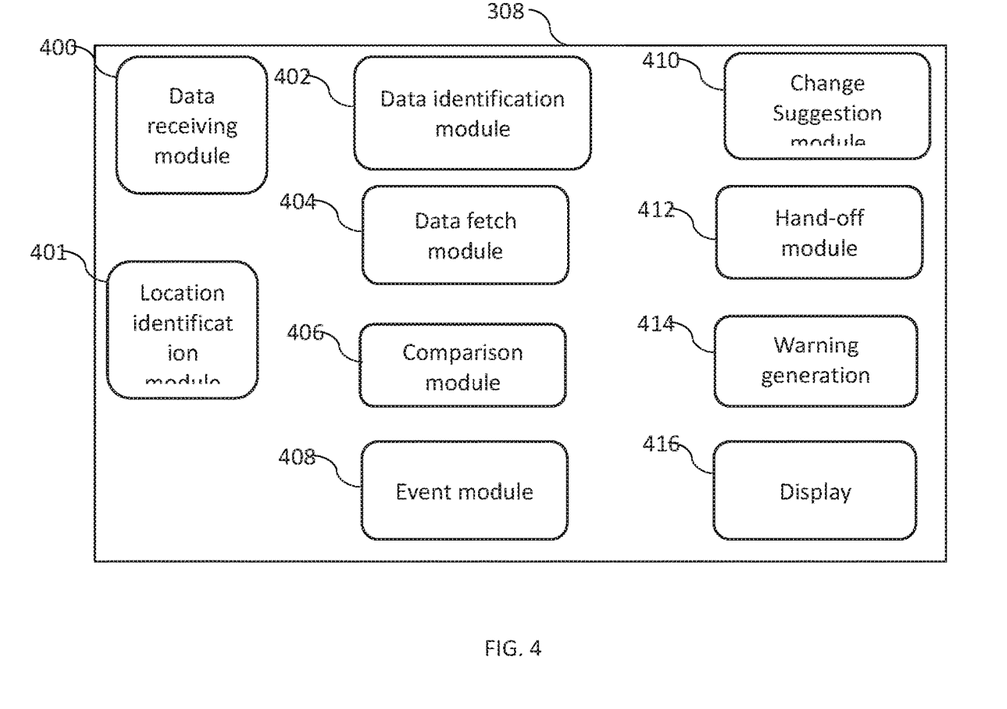
FIG. 4 illustrates various modules of a warning system, in accordance with an aspect of the present subject matter.

FIG. 4 illustrates various modules of the processor 308. The various modules may be microcontrollers functioning in tandem with each other to achieve coordinated output from the processor 308. The processor 308 includes, a data receiving module 400, a location identification module 401, a data identification module, 402, a data fetch module 404, a comparison module 406, an event module 408, a change suggestion module 410, a hand-off module 412, a warning generation module 412, and a display interface 416. The data receiving module 400 may be communicably connected to the data identification module 402, data fetch module 404, and the event module 408. The display interface 414 may be communicably connected to display screen integrated within the ADAS 106 or may be any after-market screen, or vehicle's infotainment screen, or a light bulb.

In an implementation, the modules such as the data receive module 400, the location identification module 401, the data identification module 402, the data fetch module 404, the comparison module 406, the event module 408, the change suggestion module 4010, the hand-off module 412, the display interface 416 and the warning generation module 414 may include routines, programs, objects, components, data structure and the like, which perform particular tasks or implement particular abstract data types. The modules may further include modules that supplement applications on the processor 308, for example, modules of an operating system.

Further, the modules can be implemented in hardware, instructions executed by a processing unit, or by a combination thereof.

In another aspect of the present subject matter, the modules may be machine-readable instructions which, when executed by a processor/processing module, perform any of the described functionalities. The machine-readable instructions may be stored on an electronic memory device, hard disk, optical disk or other machine-readable storage medium or non-transitory medium. In an implementation, the machine-readable instructions can also be downloaded to the storage medium via a network connection.

The data receiving engine 400 is communicably connected to the data identification module 402, the data fetch module 406 and the event module 408. The data receiving module 400 forwards the data received simultaneously to the data identification module 402, and the event module 408 for simultaneous processing. The event module 408 may also be communicably connected to the change suggestion module 410, the hand-off module 412, and the warning generation module 412.

In an example operation, the data receiving module 400 may receive data associated with environment external to the vehicle 102. The external environment data may include data like objects in front of the vehicle both stationary and mobile. Also, there may be other information like road signs, road conditions, driving pattern and characteristics of driving like rash driving or careful driving etc. This data may be then forwarded to the data identification module 402 and to the event module 408.

The data receiving engine 400 may also be configured to receive identification attributes of the driver from the driver monitoring module 306. The identification attributes data may be then forwarded to the data identification module 402.

The location identification module 401 is configured to collect the location coordinates of the vehicle in real time to detect the location. In an embodiment of the invention, the location is collected continuously and forwarded to the processing module 206. In accordance with an implementation of the invention, the location identification module 204 may be a GPS chip that continuously collects the location coordinates.

The data identification module 402, then compares the identification attributes received with a database of attributes of a plurality of drivers. The database of attributes may be within the memory 310 or may be in the central server 204, or may be present in both. Driver identified may be one of the drivers regularly driving the vehicle 102, or may be marked as a new driver.

Once driver is identified, the driver identity is sent to the data fetch module 404. The data fetch module 404, may then fetch driving behavior data of the new driver identified. In case, the driver is a new driver, the data fetch module 404 may fetch the driving behavior data for the new driver from the central server 204. In case no data is available, then a new driver data entry is created for the new driver and driving behavior is monitored. Further in case, the new driving behavior data is available from driving history of other vehicles', it is fetched by the data fetch module 404, through the data receiving module 400. The fetched data along with the location and parameters of the vehicle 102 is then sent to the comparison module 406. The data fetch module 404, also fetches the driving behavior history of the vehicle 102 simultaneously.

The optimum driving behavior is the manner in which the vehicle 102 has been driven in the past to maintain the vehicle 102 at its optimum condition and its throughput.

Under optimum driving behavior, the vehicle 102, performs at its functional best with best efficiency and fuel economy and least wear and tear of the vehicle parts. This may include optimum driving speed, turning radius, braking power, etc. of the vehicle 102. The optimum driving behavior also includes optimum driving behavior of other drivers at a location. For instance, the driving at a particular point within a city such as a sharp turn, an intersection or a flyover exit, etc. The other drives are observed to drive slow at about 10-20 Kilometer per hour (kmph) at the sharp turn and drive at a normal speed of about 30-40 Kmph at the intersection. In another example, speed regulation of vehicles driven by other drivers in a dense and sparse traffic areas of the city may also be included in the optimum driving behavior.

In case when a new driver entry is created, the comparison module 406, very discreetly compares the new driving pattern and the existing general driving behavior for the vehicle 102. Also, in case the driver is new to the vehicle 102, the comparison module 406 keeps comparing the general driving behavior with the driving behavior of the new driver. Based on the continued learning of the new driving behavior he comparison module 406 may also forecast the driving style for certain road conditions that may be upcoming like potholes, traffic condition etc. Based on forecast, the comparison module 406 may perform a comparative study and may make ready suggestive alerts and store them for future use during the journey. The forecast data may also be forwarded to the communicably connected hand-off module 412 for hand-off decisions.

In an embodiment of the invention the comparison module 406 may be configured to deduce the optimum driving behavior for the vehicle 102. The optimum driving behavior may be based on the stored driving profiles and other driving profiles for the vehicle 102. It may also take into consideration the location and its related parameters and the optimum driving behavior based on past driving history of the vehicle by one or more drivers under similar driving conditions. For e.g. for a vehicle 102, being a car, the comparison module 406 after receiving the location data that may be a traffic inflicted city area, may decide the best way the vehicle 102 was driven by a plurality of drivers who may have driven the vehicle in same or similar traffic inflicted areas for the same or similar location.

The data receiving module 400, as described earlier, also forwards the data to the event module 408. The event module 408, receives data of the exterior monitoring module 302. The event module 408, computes any upcoming event. The event may be a sudden braking of vehicle in-front, sudden movement of a pedestrian, etc. The comparison module also receives data of the driver monitoring module 306 to analyze and determine in case the driver is drowsy or sleepy to raise an event alert.

The change suggestion module 410, receives compared riving behavior result data from the comparison module 406. The change suggestion module 410, determines what kind and intensity of suggestive alerts need to be provided to the driver. For example, in case there is a minor adjustment for clutch pressing, there may be a small letter mode suggestive alert of green color that may be shown to the new driver. However, in case of a major suggestive alert, for driving too close to pedestrians, an alert in capital letters of red color may be displayed to the new driver. The suggestive alerts may be accompanied with audio as well. The intensity of the audio alerts may also change based on the event identified. The change suggestion module may be communicably connected to the warning generation module 414 that prepares the format of the suggestive alert, font of the suggestive alert, color of the alert, and also intensity attaching to the alert.

The hand-off module 412, may be connected to the event module 408 and also may be connected to Electronic control unit (ECU) of the vehicle 102. The hand-off module 412 may be activated once, a event is detected by the event module 408. The hand-off module 412 determines, based on the forecast done by the comparison module 406, whether the driver, in response to the upcoming event may be able to perform best corrective action as per the general driving behavior. For example, in case of a sudden braking of vehicle in front, whether the driver as per the forecast, can apply pressure on brake pedal in a short time or not. In case, the forecast is not favorable with the general driving behavior, the driving hand-off is performed to automated control for a particular instance of driving.

Further, the hand-off module 412 may also check, in case the forecast for the new driver coincides with the general driving behavior up to a lower and upper limit of it, that whether the driver has taken any corrective action for a threshold limit. The threshold limit may be a time limit or distance limit etc. The threshold limits may be pre-fed or may be analytically calculated by the comparison module 406 in event of a condition.

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "generating," or "monitoring," or "displaying," or "tracking," or "identifying," "or receiving," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 5:
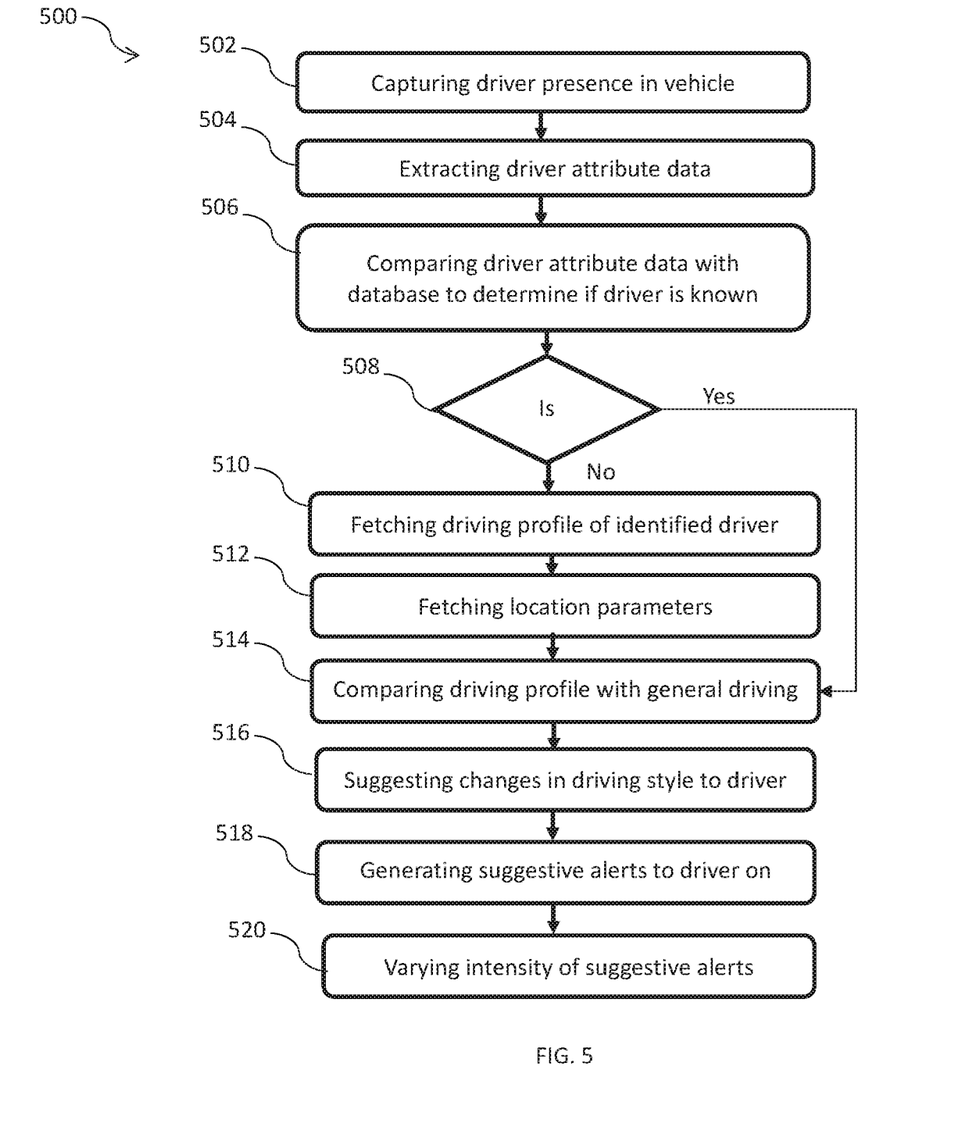
FIG. 5 illustrates a method for providing driving assistance to a driver of a vehicle, in accordance with an aspect of the present subject matter.

FIG. 5, illustrates a method 500 for providing assistance to the driver of the vehicle 102, in accordance to an embodiment of the present subject matter. The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above described system and/or the apparatus and/or any electronic device (not shown).

At step 502, the driver presence is detected within the vehicle 102. The detection may be done using presence sensing technique, motion sensing technique, etc. In an implementation, there may be special sensors like motion sensors, occupancy sensors, etc. integrated within the ADAS 106 for determining presence of the driver. After sensing the presence, the driver is identified. The ADAS 106, as described earlier may include driver monitoring camera 306 that may identify the driver.

At step 504, identification attributes of the driver are extracted. The driver attributes may be biometric scan like retinal scan, voice scan, finger print scan or even driving pattern scans as has been described earlier in the description. The driver monitoring camera 306 may take biometric scan of the face and retina of the driver for extracting attributes. Also, there may be a prompt on the display of the vehicle 102 to place finger on a designated area of the ADAS 106 for finger scanning. For finger scanning, the ADAS 106 may be supplied with adequate finger print sensing hardware like fingerprint sensors etc.

At step 506, the identification attributes extracted are compared with the attributes database stored within the memory 310 or the central server 204. Further at step 508, it is determined whether the driver identified, has already driven the vehicle 102 or similar vehicle type or whether the driver is new either to driving or to the type of vehicle 102. If the driver is not known, then at step 510, the profile of the new driver is fetched from the central database 204. Simultaneously the general driving behavior is also fetched from the memory 310 or from the central server 204.

In case, the driver is new to driving or to the type of the vehicle 102, the method 500 may include additional steps of making a new entry into the central server 204 for the new driver. The driving behavior may be then continuously saved.

At step 512, location and its defining parameters are determined and collected. Parameters may include details like city or rural area, high or low traffic area, good or bad road conditions, general driving pattern of people, hilly or plain terrain, fuel information, brake status, tire information etc.

At step 514, the driving behavior profile of the new driver is compared with the optimum driving behavior for the vehicle 102. Under optimum driving behavior, the vehicle 102, performs at its functional best with best efficiency and fuel economy and least wear and tear of the vehicle parts. The optimum driving behavior may have a lower and an upper threshold limit defined. The limits may be predefined or may be fixed by the processor 308 after learning driving behavior. The comparison may be carried out by converting the data into rasterized image using known rasterization techniques. Rasterized images of general driving behavior and the driving behavior of the new driver identified are compared to identify the deviations and the extent of deviations. At step 516, in case the deviations are more than the upper and lower threshold limits, driving style change suggestions are identified by the processor 308. These suggestive alerts, at step 518, are displayed by the processor, on the display of the vehicle 102.

At step 520, the intensity of the suggestive alerts may be varied based on the event that is being faced by the driver.

Figure 6:
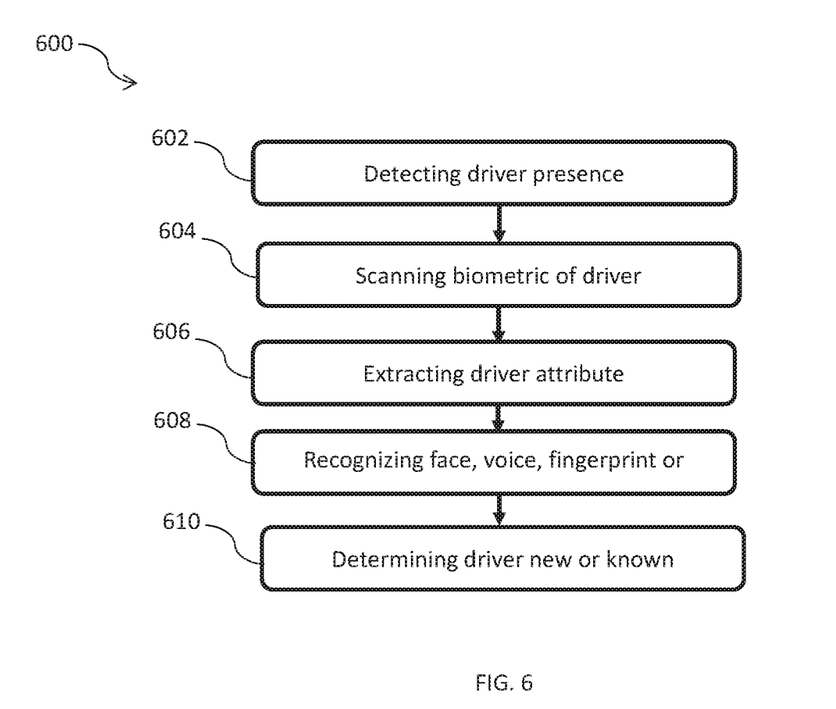
FIG. 6 illustrates a method for identifying a new driver, in accordance with an aspect of the present subject matter.

FIG. 6 illustrates a method 600, for identification of the driver of the vehicle 102. The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above described system and/or the apparatus and/or any electronic device (not shown).

At step 602, driver presence is identified within the vehicle. The driver presence may be detected using various known techniques like motion sensing, presence sensing, thermal imaging etc. At step 604, once the presence of the driver is identified, the driver monitoring module 306, scans for biometric data of the driver. At step 606, the ADAS 106, extracts various attributes of the driver. The various attributes that may be extracted for identification have been enlisted in the description earlier.

Further, at step 608, the attributes are cross verified with the set of attributes stored in the memory 310 or within the central server 204. At step 610, after verification, the identity of the driver is ascertained as a known driver or new driver.

Figure 7:
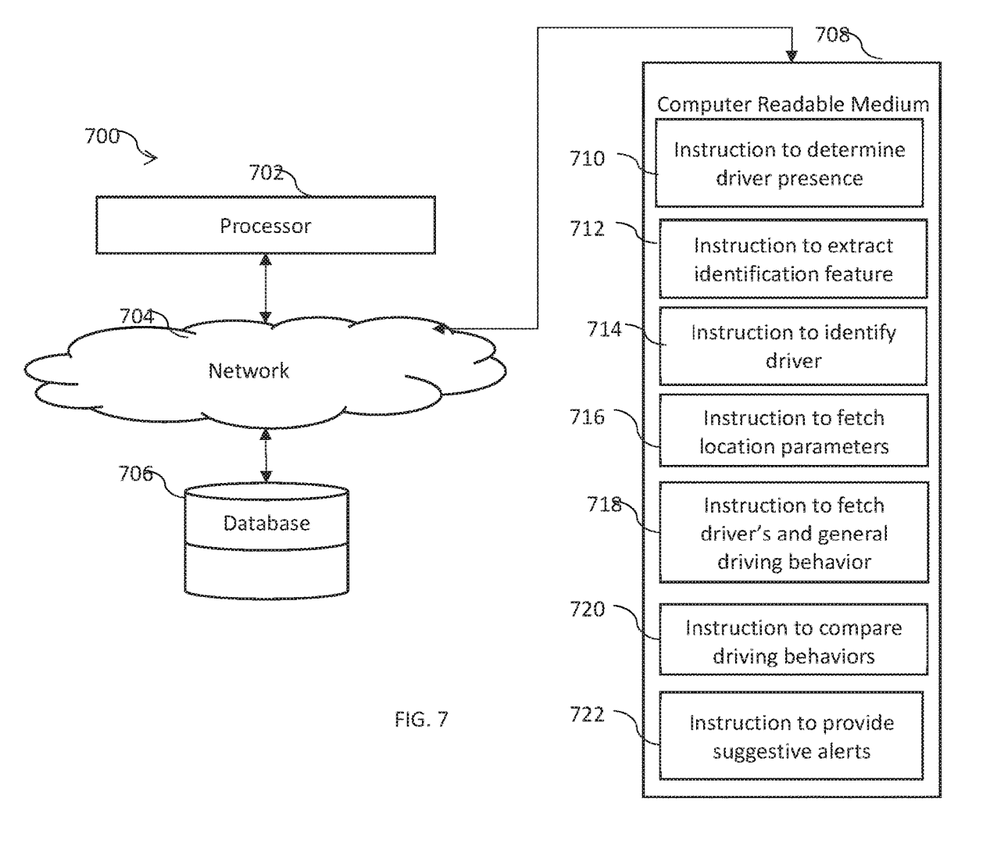
FIG. 7 illustrates an exemplary computer system, in accordance with an aspect of the embodiments.

Referring now to FIG. 7 illustrates an exemplary computer system 700 for implementing various embodiments is disclosed. The computer system 700 may comprise a central processing unit ("CPU" or "processor") 702. The processing unit 702 may comprise at least one data processor for executing program components for executing user- or system-generated requests. The processing unit 702 may include specialized processing units such as integrated system (bus) controllers, memory management control units, floating point units, graphics processing units, digital signal processing units, etc. The processing unit 702 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

In some embodiments, the processing unit 702 may be disposed in communication with a communication network 804 via a network interface (not shown in figure). The network interface may communicate with the communication network 704. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 804 may include, without limitation, a direct interconnection, local area network (LAN), wide area network (WAN), wireless network (e.g., using Wireless Application Protocol) etc.

In some embodiments, the processing unit 702 may be disposed in communication with one or more databases 706 (e.g., a RAM, a ROM, etc.) via the network 704. The network 704 may connect to the database 706 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. The database may include database from the exterior monitoring module 302, the ranging module 304 and the driver monitoring module 306.

The processing unit 702 may also be disposed in communication with a computer readable medium 708 (e.g. a compact disk, a USB drive, etc.) via the network 704. The network 804 may connect the computer readable medium 808 including without limitation, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium. The computer readable medium 708 may be processed by the computer system 700 or in any other computer system. The computer readable medium 708 may include instructions like instruction to monitor driver state, instruction to monitor external environment, instruction to detect events, instruction to generate warnings, or instructions to vary warning intensity.

It will be appreciated that, for clarity purposes, the above description has described embodiments of the present subject matter with reference to different functional units and processors. However, it will be apparent that any suitable distribution of functionality between different functional units, processors or domains may be used without detracting from the present subject matter.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

Alternatively, the method may be implemented using a combination of a processing unit 702, a non-transitory Computer Readable Medium (CRM) 708, Database 706 all connected to a network 704. The computer readable medium may include instructions that may be fetched by the processing unit 702. The instructions may include instruction to determine driver presence 710, instruction to extract identification attribute 712, instruction to identify driver 714, instruction to fetch location and its parameters 716, instruction to fetch driver's driving behavior and optimum driving behavior 718, and instruction to comparing driving behaviors 720, and instruction to provide suggestive alerts 722.

In one example, the processing unit 702 may execute the instruction to determine driver presence 710 to initiate determining of the driver presence by driver monitoring module 306. The driver monitoring module 306 may determine a driver's presence using motion, presence and thermal sensing techniques. Further, the processing unit 702 may also execute the instruction to extract identification attributes 712.

In an example implementation, the processing unit 702 may execute the instruction to identify driver 714 after comparing the attributes received with the attributes database. The attributes may be a facial scan, a retinal scan, a thermal scan, biometric scans like fingerprints etc. After identifying the driver, the processing unit 702 may execute the instruction to fetch location and parameters 716 and instruction to fetch driver's driving behavior and general driving behavior of 718.

Thereafter, the processing unit 702 executes the instruction to compare the driving behaviors 720 to determine deviations from general driving behavior. Further, the processing unit 702 may execute instruction to provide suggestive alerts 722.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

Therefore, the present subject matter provides an efficient mechanism of detecting an event and issuing relevant warning to the user with accuracy, wherein the intensity is varied as per the situation. Variation of the intensity helps in providing apt level of warning to the driver of the vehicle that enables the driver to take apt decision about handling the situation and improves driver experience. Further, the present subject matter detects event in situations when one data set may not be available thereby increasing robustness and reliability of the system and enhancing overall driver safety.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

We claim:

1. A method for assisting a driver of a vehicle, the method comprising:
   determining presence of the driver in the vehicle based on at least one attribute of the driver;
   comparing, the at least one attribute of the driver with a plurality of attributes of stored driving profiles of plurality of drivers to determine the driver to be a new driver;
   detecting location of the vehicle;
   deducing an optimum driving behavior based on the stored driving profiles and the other driving profiles for vehicle and the location, the optimum driving behavior based on past driving history of the vehicle by one or more drivers under the driving conditions;
   detecting an event; and
   generating a suggestive alert for the new driver to handle the vehicle for the event,
   wherein variation of an intensity of the suggestive alert is based on the event faced by the driver.

2. The method of claim 1, wherein generating the suggestive alert comprises:
   determining if the new driver has a driving profile stored in a central server, the driving profile indicative of data associated with driving behavior of the new driver for other vehicles under the driving conditions;
   fetching, driving profile of the new driver,
   comparing, the driving profile of the new driver with an optimum driving behavior, and providing a suggestive alert.

3. The method of claim 2, wherein a new driving profile entry is created in case there is no history for the new driver.

4. The method of claim 1, further comprises the driving behavior of the new driver under the driving conditions wherein driving conditions include surrounding condition of vehicle and the driver data comprising driving style, braking pattern, highway driving, city driving, and types of vehicle driven before.

5. The method of claim 4, further comprising initiating take-over of vehicle handling at instances wherein, the driving profile is not within a threshold limit of the optimum driving behavior.

6. The method of claim 1, further comprising defining upper and lower threshold limit of the optimum driving behavior.

7. The method of claim 6, wherein the biometric feature is a face recognition, a voice recognition, a fingerprint recognition, or a retinal scan.

8. The method of claim 1, wherein the at least one attribute is anyone or a combination of a biometric feature, and a driving style behavior.

9. A driver assistance system comprising:
   A processor, wherein the processor further comprises:
   A data identification module, wherein the data identification module is configured to determine presence of a driver, and extract at least one attribute of the driver;
   A location identification module, configured to identify location and its multiple parameters;
   A comparison module, wherein the comparison module is configured to compare the at least one attribute of the driver with a plurality of attributes of stored driving profiles of plurality of drivers to determine a new driver;
   A data fetch module, wherein the data fetch module is configured to fetch driving profile of the new driver, wherein the driving profile comprises data associated with driving behavior of the new driver for the vehicle and the location under driving conditions;
   a change suggestion module, wherein the change suggestion module is configured to compare the driving profile of the new driver with an optimum driving behavior, the optimum driving behavior being indicative of past driving history of the vehicle by one or more drivers under the driving conditions for the similar location and the vehicle; and
   a warning module, wherein the warning module is configured to generate a suggestive alert for the new driver to handle the vehicle for an event, wherein variation of an intensity of the suggestive alert is based on the event faced by the driver.

10. The system of claim 9, wherein the warning display module is an LED light, or an LCD module.

11. The system of claim 9, wherein the driver assistance system is connected to a server.

12. The system of claim 11, wherein the server is further connected to a plurality of driver assistance systems.

13. The system of claim 12, wherein the plurality of connected driver assistance system share data with each other through the server for adaptive learning.

14. The system of claim 9, wherein the data identification module is a biometric scan module.

15. The system of claim 14, wherein the biometric scan module identifies driver based on a face recognition, a voice recognition, a fingerprint recognition, or a retinal scan of the driver.

* * * * *